United States Patent
Pier

(10) Patent No.: US 10,963,855 B2
(45) Date of Patent: Mar. 30, 2021

(54) PORTABLE VEHICLE FUELING KIOSK

(71) Applicant: Robert Pier, Jurupa Valley, CA (US)

(72) Inventor: Robert Pier, Jurupa Valley, CA (US)

(73) Assignee: DC Logistics, Corona, CA (US)

( * ) Notice: Subject to any disclaimer, the term of this patent is extended or adjusted under 35 U.S.C. 154(b) by 465 days.

(21) Appl. No.: 15/928,444

(22) Filed: Mar. 22, 2018

(65) Prior Publication Data

US 2018/0285847 A1    Oct. 4, 2018

Related U.S. Application Data

(60) Provisional application No. 62/481,021, filed on Apr. 3, 2017.

(51) Int. Cl.
| | | |
|---|---|---|
| *G06Q 20/18* | (2012.01) | |
| *G06Q 20/14* | (2012.01) | |
| *B67D 7/04* | (2010.01) | |
| *B67D 7/40* | (2010.01) | |
| *B67D 7/78* | (2010.01) | |
| *G07F 13/02* | (2006.01) | |
| *B67D 7/76* | (2010.01) | |
| *B67D 7/42* | (2010.01) | |
| *B67D 7/62* | (2010.01) | |
| *B67D 7/10* | (2010.01) | |
| *B67D 7/36* | (2010.01) | |
| *B67D 7/34* | (2010.01) | |
| *B67D 7/32* | (2010.01) | |

(52) U.S. Cl.
CPC .............. *G06Q 20/18* (2013.01); *B67D 7/04* (2013.01); *B67D 7/40* (2013.01); *B67D 7/78* (2013.01); *G06Q 20/14* (2013.01); *G06Q 20/145* (2013.01); *G07F 13/025* (2013.01); *B67D 7/10* (2013.01); *B67D 7/3209* (2013.01); *B67D 7/348* (2013.01); *B67D 7/362* (2013.01); *B67D 7/42* (2013.01); *B67D 7/62* (2013.01); *B67D 7/763* (2013.01)

(58) Field of Classification Search
CPC ...... G06Q 20/18; G06Q 20/145; G06Q 20/14; B67D 7/78; B67D 7/04; B67D 7/40; B67D 7/362; B67D 7/348; B67D 7/3209; B67D 7/763; B67D 7/42; B67D 7/62; B67D 7/10; G07F 13/025
USPC .......................................................... 705/16
See application file for complete search history.

(56) References Cited

U.S. PATENT DOCUMENTS 7,201,315 B2    4/2007  Symonds et al.
7,478,747 B2    1/2009  Call et al.
(Continued)

*Primary Examiner* — Russell S Glass
(74) *Attorney, Agent, or Firm* — Kirk A. Buhler; Buhler & Associates Patenting

(57) ABSTRACT

Improvements in a portable vehicle fueling kiosk is disclosed. The kiosk is constructed on a pallet or a skid that allows the kiosk to be placed, located or moved to a location where the fuel dispensing is desired. A fuel tanker that would normally dispense fuel to a storage tank of a gas station is connected to one side of the kiosk. The kiosk accepts payment by nearly any form of money, credit card or token to measure, dispense and bill or invoice the user. The kiosk can have a Wi-Fi or cellular communication to communicate with a user at a distance and can monitor, use, status and remaining fuel in the tanker. If a fuel tanker has been depleted additional tankers can be connected to the kiosk, and when the kiosk is no longer needed it can be transported to another location.

19 Claims, 4 Drawing Sheets

(56) References Cited

U.S. PATENT DOCUMENTS

2013/0282500 A1\* 10/2013 Latorre ................. G07F 13/02
 705/17
2015/0220896 A1 8/2015 Carr et al.

\* cited by examiner

PORTABLE VEHICLE FUELING KIOSK

CROSS REFERENCE TO RELATED APPLICATIONS

This application claims the benefit of Provisional Application Ser. No. 62/481,021 filed Apr. 3, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a portable vehicle fueling kiosk. More particularly, the present portable vehicle fueling and billing kiosk allows for a kiosk that connects to a fuel tanker on one side of the kiosk and a human or commerce transport vehicle on the other side of the kiosk.

Description of Related Art Including Information Disclosed Under 37 CFR 1.97 and 1.98

Fuel transport vehicles transport fuel in large quantities to a fuel distribution station where the fuel is transferred from the fuel transport vehicle to a holding tank. A consumer or other person that needs the fuel then pumps the fuel from the holding tank into their tank. The fuel transport vehicle holds large quantities of fuel of about 3,000 to 9,000 gallons, or typically 7,500 gallons and they bill the distribution station or the owner of the gas station that disperses the fuel. A consumer only pays for the fuel of about 5-15 gallons at a time. When a consumer purchases fuel at a gas station they either pay in advance or use a credit card for the purchase. There is no mechanism that allows a single vehicle to purchase gas from a fuel tanker on an individual basis.

A number of patents and or publications have been made to address these issues. Exemplary examples of patents and or publication that try to address this /these problem(s) are identified and discussed below.

U.S. Pat. No. 7,478,747 was issued to William Call on Jan. 20, 2009 and is entitled Retail sales and dispensing fuel management system. This patent discloses managing the dispensing of petroleum products. A kiosk (e.g., at a gas station) and fuel management system are connected over a network. The fuel management system maintains balances for fuel purchasing accounts that can be debited to purchase fuel. To purchase fuel, a customer enters credentials identifying a fuel purchasing account at the kiosk. While this invention is for a fuel kiosk, the kiosk is connected to the gas station and not to a fuel tanker.

U.S. Pat. No. 7,201,315 issued on Apr. 10, 2007 to Michael J. Symonds et al., and is entitled Service station car wash. This patent discloses an improved service station car wash system. A car wash kiosk is coupled to the fuel dispenser communication loop in the forecourt of the service station so that the car wash kiosk appears to the service station controller just as a fuel dispenser would. The car wash kiosk sends a car wash request over the fuel dispenser communication loop to the service station site controller. Again, this patent does not connect the consumer to a fuel tank.

U.S. Publication Number 2013/0282500 for Murillo Grandino Latorre is titled Vehicle Fueling System and Method. This publication discloses a vehicle fueling system and method which uses an internet-based user interface accessible by a user. The user accesses the user interface through a smartphone application, a computing device, call center, or a kiosk situated at a parking facility. The user accesses the user interface to notify a service provider that a vehicle in need of fuel. While the vehicle is parked in a parking lot, the service provider responds to the user's notification, and dispatches a fuel truck to deliver fuel to the vehicle. In this publication, the application bills the consumer and the fuel truck carries only a limited amount of fuel to the vehicle.

U.S. Publication Number 20150220896 was published for David Jon Carr et al., and is titled Kiosk Transactions. This publication discloses facilitation of a transaction for one or more items with a customer via a kiosk. In embodiments, the kiosk is located at or proximate to a retail store. In embodiments, a customer can order products or services via an ordering platform such as a merchant website. The customer may receive an order confirmation and a unique transaction identifier. The customer may then travel to a kiosk at the store and enter the transaction identifier to recall the order. This kiosk is not for fueling and does not involve a fuel tanker.

What is needed is a portable fueling kiosk that can be moved and placed at nearly any location and connects directly to a large capacity fuel tanker on one side of the kiosk and to a vehicle on the other side of the kiosk. A consumer or company can individually pump and pay for gas from the kiosk. The proposed portable vehicle fueling kiosk provides the solution.

BRIEF SUMMARY OF THE INVENTION

It is an object of the portable vehicle fueling kiosk to include a kiosk. The kiosk accepts payment by nearly any form of money, credit card or token. This allows the kiosk to operate with nearly any method of payment to allow the kiosk to transfer fuel from the tanker to a vehicle that is connected to the kiosk. The use of the kiosk allows the fueling of each vehicle to be charged to a single or a collective account. The kiosk can have a Wi-Fi or cellular communication to a host that prepares and send billing to the correct party for payment. Because the kiosk has communication to a host or other master, the kiosk can notify the master or a person or party that the fuel in the fuel tank is nearing empty and can be replaced. The communication can also include a camera, microphone or other monitoring device to capture images, movies, sound as well as performing two-way communications.

It is another object of the portable vehicle fueling kiosk for the kiosk to be constructed on a pallet or a skid that allows the kiosk to be placed, located or moved to a location where the fuel dispensing is desired. When the use of the kiosk is not needed, the kiosk can be disconnected from the fuel tanker and moved. The tanker can then be transported in its normal method of transportation. In some cases, like a race track a special type of fuel is needed and the fuel can be dispensed to other tanks. In other cases, the fuel is needed at a location with one or many vehicles and the kiosk can be used by a company to fill the vehicles.

It is another object of the portable vehicle fueling kiosk to accept a fuel tanker on one side of the kiosk. The tanker has a standard tanker connection that would normally provide fuel in large quantity to a gas station. The tanker can be gravity fed or provided by a pressurized flow. The kiosk can be self-powered by batteries, have a power connection or can have a solar charging station to maintain power at the kiosk to operate the pump and the communication for the credit card or other transaction acknowledgement.

It is another object of the portable vehicle fueling kiosk for the kiosk to have a dispensing nozzle that connects with a fuel tank of a vehicle. The vehicle can be a car, motorcycle, truck, ATV, jet-ski or other vehicle that operates on fuel. The fuel can be a standard petroleum based fuel, or can be another type of fuel from diesel to liquid propane or other fuel type.

It is still another object of the portable vehicle fueling kiosk to be autonomous whereby once the fuel tank is connected to the kiosk, a user can simply drive to the kiosk and follow the prompts to make payment and fuel their vehicle without assistance. At the conclusion of dispensing fuel into their vehicle they can drive away.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
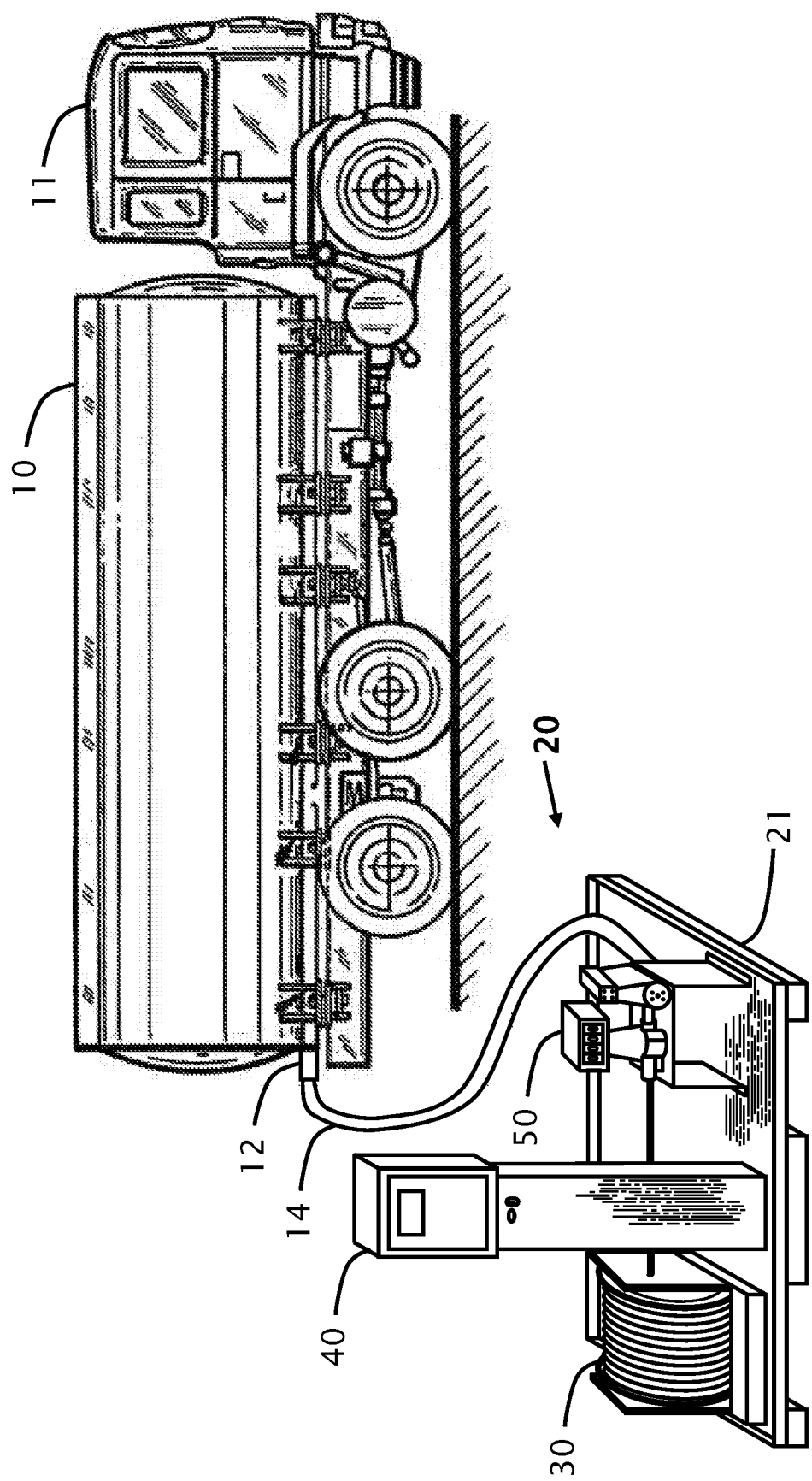
FIG. 1 shows fuel delivery truck connected to a portable vehicle fueling kiosk.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

ITEM NUMBERS AND DESCRIPTION 10 fuel tank
11 engine
12 connection
14 hose
20 fueling kiosk
21 skid
22 side wall(s)
23 elevated runner
24 openings
30 extendable hose
31 hose reel motor
32 hose reel
33 dispensing nozzle
40 payment processing system
41 electrical panel
42 switch/control
48 enclosure
49 canopy
50 delivery counter
51 pulse transmitter
52 solenoid
53 meter
54 valve
55 filter
60 fuel inlet
61 pump
62 speed reducer
63 motor
64 pipe
65 air eliminator
66 hose
67 burp tank
68 valve
70 emergency stop
71 fuel supply port
72 door
73 top cover
74 drip rim
75 latch
76 safety controls FIG. 1 shows fuel delivery truck connected to a portable vehicle fueling kiosk 20. The kiosk 20 is configured on a platform that can be lifted with a forklift for transportation to a location and can then be lift and transported on a flatbed truck to another location where it is needed. The fuel tank 10 is delivered to the desired location and the engine 11 is separated from the fuel tank 10. The fuel truck has no pumping capacity by itself, and fuel is generally gravity dropped into a tank stored underground at a gas station.

In this embodiment, the connection 12 to the fuel is with a hose 14 that connects between the fuel truck and the kiosk 20. Depending upon the configuration of the fuel tank 10 and the kiosk 20, the connection to the fuel tank 10 can exist over the top of the kiosk 20 to collect any fuel within the skid 21. Since the components of the portable vehicle fueling kiosk 20 are all welded or otherwise secured to the skid 21, any leaks are contained within the elevated walled sides of the skid where it can be cleaned on-site or transported to another location for recovery and cleaning.

The portable vehicle fueling kiosk 20 is self-contained or can be powered by an external power 110-230-volt source. The portable vehicle fueling kiosk 20 includes an extendable hose 30 to connect to a personal or company car or truck. The portable vehicle fueling kiosk 20 further includes a payment processing system 40 and a delivery counter 50 that measures the amount of fuel that has been dispensed for billing or accounting to the vehicle.

Figure 2:
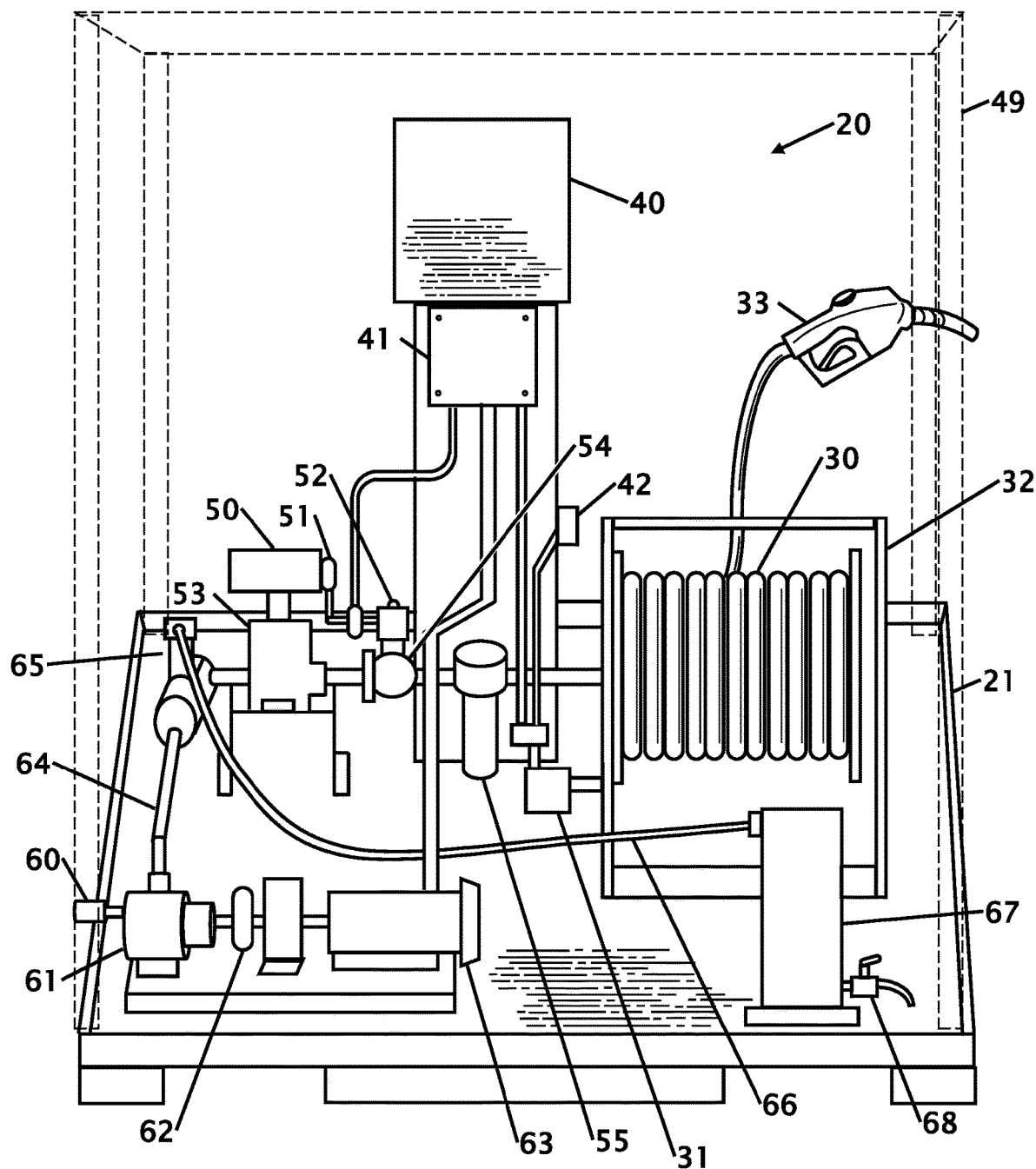
FIG. 2 shows a rear view of the portable vehicle fueling kiosk.

FIG. 2 shows a rear view of the portable vehicle fueling kiosk 20. The portable vehicle fueling kiosk 20 is constructed on a skid 21 with elevated sides that collect any spills that may occur from the fuel transportation and delivery above the outline of the side walls of the skid 21.

Starting at the connection to a hose from a fuel tank 60. In this embodiment, the connection to the fuel tank is with a 2-inch D coupler, but other connection pipe diameters are contemplated. The fuel inlet 60 is connected to a high capacity pump 62 that can deliver the fuel to a vehicle at a high rate of flow. The higher flow rate reduces the time a vehicle and the worker are at the portable vehicle fueling kiosk 20. The pump 61 is connected to a speed reducer 62 and then to a motor 63 that is rated for operation in hazardous locations where volatile/flammable fuels are present. While a particular combination of motor 63, speed reducer 62 and pump 61 is shown and described, other combinations are contemplated including a single motor-pump combination. The pump 63 is electrically connected to the payment terminal 40 that only operates the pump 63 when payment has been authorized.

The pump 61 pumps fuel through a pipe 64 to an air eliminator 65. A hose 66 connects the air eliminator 65 to a burp tank 67. This combination of components allows the system to evacuate air from the hoses that connect from the fuel tank to the fuel measurement system. The burp tank 67 has a valve 68 where any fuel that is collected in the burp tank 67 can be drained and recovered.

After the air eliminator 65 the fuel is transported to a meter 53. The meter 53 has a pulse transmitter 51 that accurately measures the amount of fuel that enters the meter 53. A solenoid 52 that is connected to a valve 54 opens to allow fuel to flow towards the hose 30. The solenoid 52 is operated when sufficient pressure has been generated by the motor-pump, or when sufficient time has elapsed to provide a stable flow out the delivery nozzle 33. The solenoid 52 can further stop the flow of fuel through the valve 54 if the system detects that the tank of a connected vehicle is sufficiently filled to eliminate spilling fuel.

Before fuel is delivered, the fuel enters a filter 55 that eliminated particles and debris from the fuel. In the preferred embodiment, the filter is a 10 micron filter, but other filter sizes are contemplated. The fuel filter 55 is replaceable and can be replaced at a desired interval or amount of fuel that has been dispensed.

The fuel then flows into a hose 30 on a hose reel 32. The hose 30 terminates at a dispensing nozzle 33 that can be connected to a vehicle or a container. The size of the dispensing nozzle 33 is sized based upon the fuel that is being dispensed to reduce the potential of the wrong fuel being delivered. For example, a diesel fuel nozzle is a different diameter from an unleaded fuel nozzle.

The hose reel 32 is long enough to reach around large vehicles. Because the hose 30 on the reel 30 is long, a hose reel motor 31 is used to retract the hose 30. A switch/control 42 allows an operator to retract the hose 30. A clutch is released to allow a person to withdraw the desired length of hose 30. A stop on the hose reel 32 can also stop the hose reel motor 31 from retracting the hose 30 when the nozzle 33 is retracted to the hose reel 32.

The portable vehicle fueling kiosk 20 has a billing terminal 40 for accounting of the fuel that has been dispensed and also for payment or accounting of the amount of fuel that was dispensed to a particular vehicle or vehicles. The billing terminal is connected to a power source/electrical panel 41 that operates the motor 63, mechanical systems and billing terminal 40. The electrical panel 41 is preferably powered by a 110 to 240-volt power source, but it is contemplated that the portable vehicle fueling kiosk 20 can be covered by a canopy 49 that has solar cells with batteries that powers the portable vehicle fueling kiosk 20 and can provide lighting with the portable vehicle fueling kiosk 20 if it is placed at a distance from a reliable power source.

Figure 3:
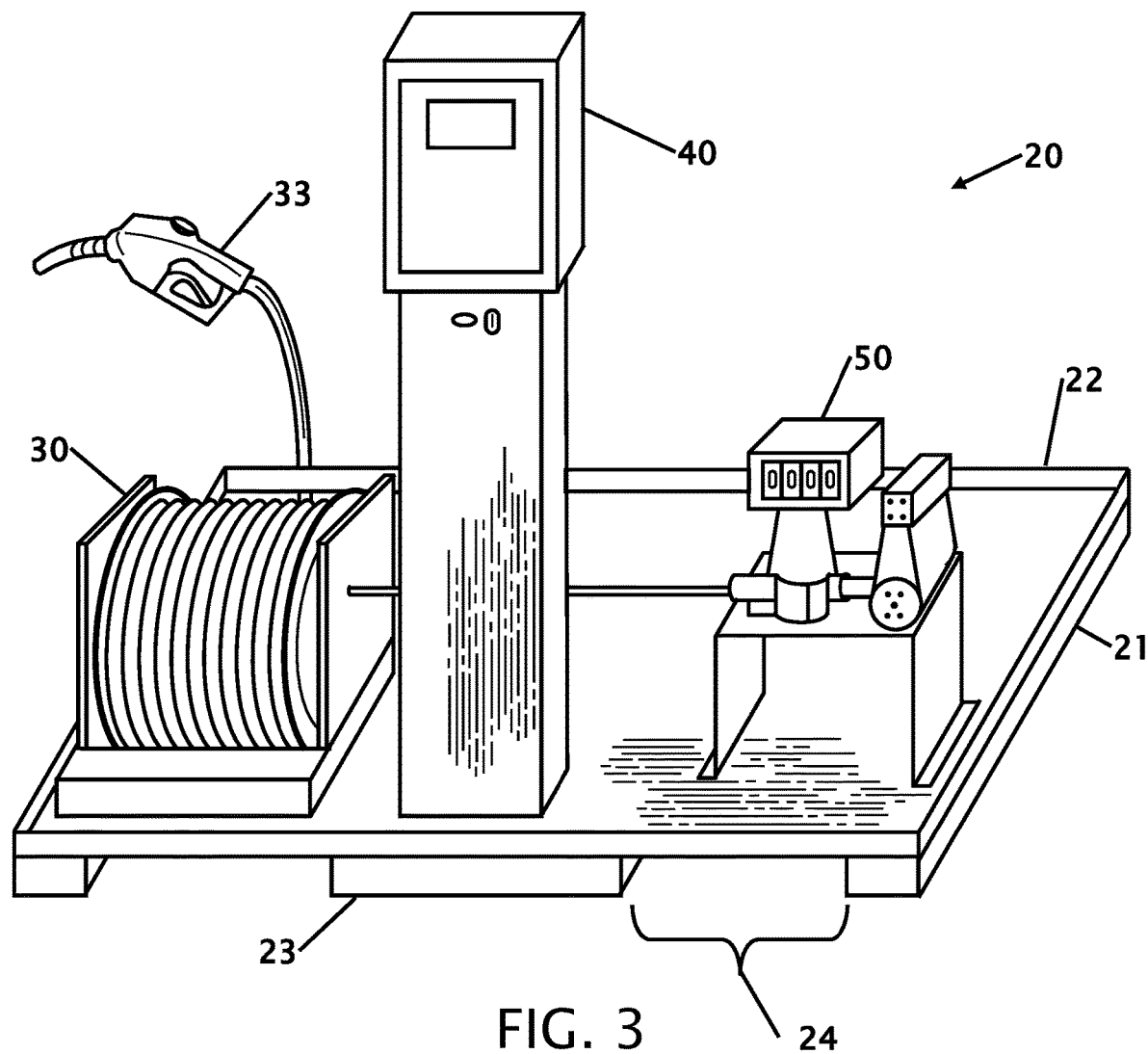
FIG. 3 shows a front view of the portable vehicle fueling kiosk.

FIG. 3 shows a front view of the portable vehicle fueling kiosk 20. This front view is what a user sees when the visit the portable vehicle fueling kiosk 20. While the embodiment shown has most or all of the components exposed, it is contemplated that the components can be enclosed in a housing or skin. The portable vehicle fueling kiosk 20 is shown on a skid 21 with elevated side walls 22 that collected any spills of fuel. The skid is configured on elevated runners 23 with openings 24 where a forklift can lift/move the portable vehicle fueling kiosk 20. The user will see the hose reel 30 with the dispensing nozzle 33.

The kiosk 40 provides a method for payment by credit card or ID card. The billing terminal can operate on a wireless cellular communication, Wi-Fi, or a wired connection, depending upon the desired configuration. The billing terminal is locked to prevent damage and reduce theft. The user can also see a delivery counter 50 where the amount of dispensed fuel is visible in real-time.

Figure 4:
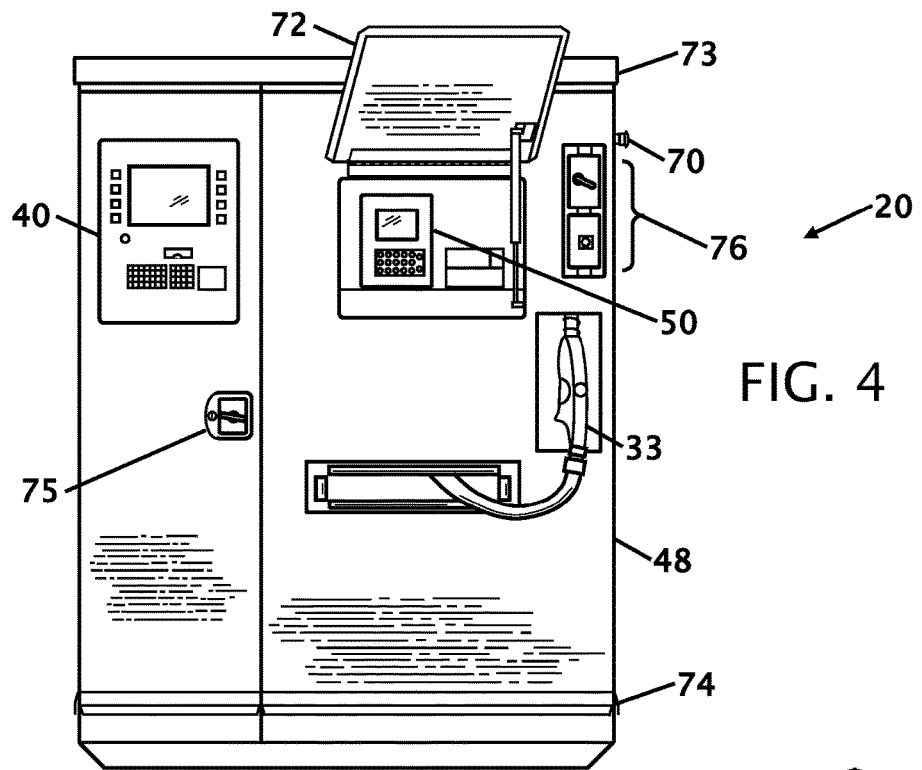
FIG. 4 shows a front view of an enclosed fuel delivery kiosk.
Figure 5:
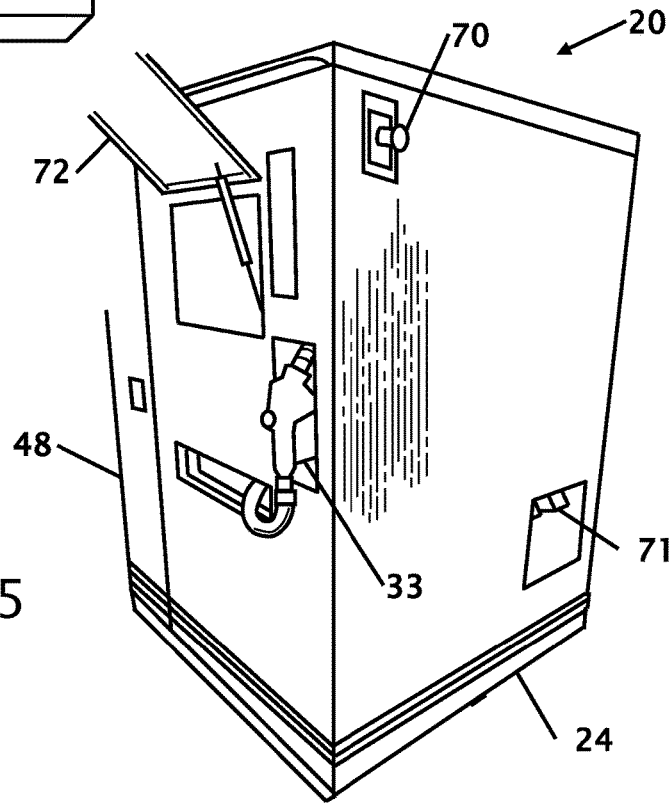
FIG. 5 shows a side perspective view of the enclosed fuel delivery kiosk.

FIG. 4 shows a front view of an enclosed fuel delivery kiosk and FIG. 5 shows a side perspective view of the enclosed fuel delivery kiosk. The enclosure 48 is self-contained, weather proof, graffiti proof by virtue of the stainless steel exterior skin. The enclosure 48 still retains the elevated rails and openings 24 to allow the enclosure 48 to be lifted and moved with a forklift or pallet jack. The front of the portable vehicle fueling kiosk 20 has a first meter for a payment and processing system 40 that accepts multiple payment methods as previously disclosed. This portion can remain open or can include a cover that protects the first meter that is used as a payment and processing system 40 in off hours. A latch 75 for securing access to the payment system and the internal components. The enclosure 48 has a top cover 73 that that hangs over the side walls of the enclosure 48. The lower portion of the enclosure has a drip rim 74 to prevent fluid from dripping into the enclosure.

An access door 72 covers the second meter that is used as a delivery counter 50. Delivery of fuel is from the dispensing nozzle 33 that is connected to a hose reel that is located within the enclosure. One or a number of safety and controls 76, such as a power hose retractor, are located on the front or side of the cabinet to control the portable vehicle fueling kiosk 20. The controls also include and emergency shut-off 70 to prevent potential hazard from a fuel spill. Fuel is supplied to the portable vehicle fueling kiosk 20 with a fuel supply port 71 where a fuel truck can be connected for measured retail distribution of the fuel directly from the tanker to a fuel tank of a vehicle without storing the fuel in an intermediate tank for storage or distribution from the intermediate storage tank.

Thus, specific embodiments of a portable vehicle fueling kiosk have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A portable vehicle fueling kiosk comprising:
   a portable kiosk having a first hose that connects to a fuel tank that contains a quantity of vehicle fuel and said fuel tank does not include a measurement mechanism;
   said portable kiosk being mounted on a skid having elevated side walls wherein upon said skid is mounted further including a pumping and measuring mechanism that is not present on said fuel tank;
a billing communication metering apparatus on said skid, and
a second hose on a hose reel that is connected to a fueling nozzle connected to said pumping and measuring mechanism.

2. The portable vehicle fueling kiosk according to claim 1, wherein said connection to said fuel tank is with a 2-inch coupler.

3. The portable vehicle fueling kiosk according to claim 1, wherein said pumping is with a high flow rate pump.

4. The portable vehicle fueling kiosk according to claim 3, wherein said pump is connected to a speed reducer.

5. The portable vehicle fueling kiosk according to claim 4, wherein said speed reducer is connected to a motor.

6. The portable vehicle fueling kiosk according to claim 1, wherein said reel is retractable.

7. The portable vehicle fueling kiosk according to claim 1, wherein said reel has a power retracting mechanism.

8. The portable vehicle fueling kiosk according to claim 1, wherein said vehicle fuel is gravity delivered from said fuel tank.

9. The portable vehicle fueling kiosk according to claim 1, further includes an air eliminator.

10. The portable vehicle fueling kiosk according to claim 9, further includes a burp tank.

11. The portable vehicle fueling kiosk according to claim 10, wherein said burp tank includes a drain valve.

12. The portable vehicle fueling kiosk according to claim 1, further includes fuel filter.

13. The portable vehicle fueling kiosk according to claim 1, wherein said kiosk includes an enclosure.

14. The portable vehicle fueling kiosk according to claim 13, wherein said enclosure has a safety shut-off switch.

15. The portable vehicle fueling kiosk according to claim 13, wherein said enclosure has an exterior stainless-steel skin.

16. The portable vehicle fueling kiosk according to claim 13, further includes a second enclosure wherein said second enclosure is weatherproof.

17. The portable vehicle fueling kiosk according to claim 13, wherein said enclosure and said skid has an elevated bottom that is configured for access with a forklift or a pallet jack.

18. The portable vehicle fueling kiosk according to claim 1, wherein said billing communications metering apparatus accepts payment from a group consisting of a credit card, cash, a debit card, a payment processing center, a customer account, a bank account or a credit account.

19. The portable vehicle fueling kiosk according to claim 1, further includes a second metering communications system that provides a notification when said fuel tank is empty, near empty or at a future time/date when said fuel tank needs replacement.

* * * * *